United States Patent

Georgs et al.

[11] Patent Number: 5,950,692
[45] Date of Patent: Sep. 14, 1999

[54] ARRANGEMENT FOR LIMITING THE FILL LEVEL OF A FUEL TANK

[75] Inventors: Georg Georgs, Stuttgart; Dieter Scheurenbrand, Wolfschlugen; Roland Schirmer, Stuttgart; Thorsten Stahl, Böblingen; Manfred Stotz, Aichwald, all of Germany

[73] Assignee: DaimlerChrysler AG, Stuttgart, Germany

[21] Appl. No.: 08/984,525

[22] Filed: Dec. 3, 1997

[30] Foreign Application Priority Data

Dec. 4, 1996 [DE] Germany ............... 19650194

[51] Int. Cl.$^6$ ........................................ B65B 1/30
[52] U.S. Cl. ................ 141/198; 141/211; 141/212; 137/409; 137/408; 137/428
[58] Field of Search .................... 141/198, 211, 141/212, 217, 218, 220, 223, 229, 204, 205; 220/86.2; 137/409, 448, 592, 425, 428, 434, 442

[56] References Cited

U.S. PATENT DOCUMENTS 2,299,360  10/1942  Tharp ......................... 137/428

FOREIGN PATENT DOCUMENTS

| 0 382 949 | 8/1990 | European Pat. Off. . |
| 697 551 | 10/1940 | Germany . |
| 2 252 301 | 8/1992 | United Kingdom . |

Primary Examiner—Henry J. Recla
Assistant Examiner—Timothy L. Maust
Attorney, Agent, or Firm—Klaus J. Bach

[57] ABSTRACT

In an arrangement for limiting the fill level in a fuel tank having a filler neck with a tank inlet end, a valve flap is pivotally supported in the inlet end such that, in an open position, the valve flap is pivoted toward the fuel flow entering the tank during refueling and is connected, by way of a crank arm and a coupling rod to a float which is disposed in an essentially vertical guide tube. The coupling rod extends through the float and has spaced top and bottom stops providing for lost motion coupling between the float and the coupling rod whose weight is sufficient to keep the valve flap in an open position. When the fuel in the tank lifts the float and, after the float engages the top stop, lifts the coupling rod, closing movement of the valve flap is initiated which is then fully closed by the inflowing fuel utilizing the lost motion distance between the float and the bottom stop of the coupling rod.

6 Claims, 1 Drawing Sheet

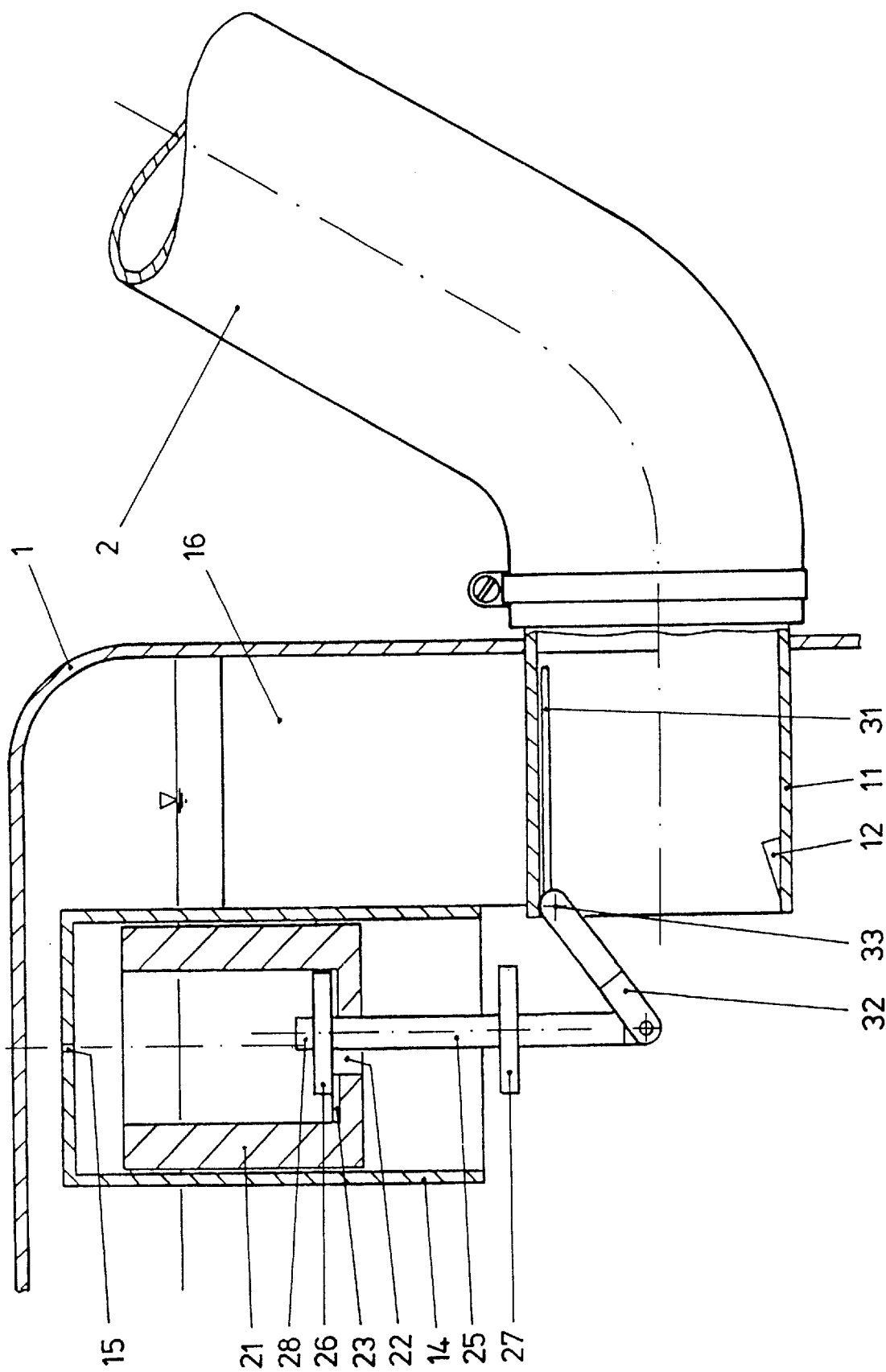

ARRANGEMENT FOR LIMITING THE FILL LEVEL OF A FUEL TANK

BACKGROUND OF THE INVENTION

The invention resides in an arrangement for limiting the fuel level in a fuel tank with a flap valve disposed at the inner end of a filler tube and having a valve flap which can be closed by a four link crank of breech mechanism utilizing a float by which the flap can be closed when the liquid level in the tank reaches a certain level by way of a coupling rod which is linked to a crank arm mounted on the valve flap support shaft.

DE-PS 69 7551 shows such an arrangement wherein the tank filler pipe is provided with a throttle flap, which is controlled by a float. The throttle flap fully or partially closes the filler pipe when the float is lifted by the rising liquid level at the end of the tank filling procedure. The float and the throttle flap are part of a centered linear crank breech mechanism. The various drive elements are so coupled that, for each position of the float, there is a specific corresponding position of the throttle flap. As a result, the filler pipe is again opened to the full extent only when the liquid level in the tank has fallen sufficiently that the float is no longer floating on liquid, that is, when it does not generate any buoyancy any more. With relatively flat tanks as they are used in motor vehicles, this has the disadvantage that the throttle flap keeps the tank or rather the filler pipe closed for a relatively long period and accordingly prevents the filling of a partially emptied tank.

In addition, fuel is backed up in the filler pipe of such an arrangement until the float opens the throttle flap when the liquid level has finally fallen sufficiently. With a movable tank, at least part of the fuel backed up in the filler pipe can be lost through the filler pipe opening by swishing movements for example.

It is therefore the principal object of the present invention to provide an arrangement which prevents over-filling of a tank and which permits refilling of a tank already after consumption of a relatively small amount of fuel such as several percent of the tank content. The arrangement should require few movable parts and should be service-free and operate safely. In addition, the arrangement should not be able to generate noises when installed in a movable tank such as in a motor vehicle tank. Also the filler pipe should not be able to spill any backed up liquid out of the filler opening after the filling procedure has been completed.

SUMMARY OF THE INVENTION

In an arrangement for limiting the fill level in a fuel tank having a filler neck with a tank inlet end, a valve flap is pivotally supported in the inlet end such that, in an open position, the valve flap is pivoted toward the fuel flow entering the tank during refueling and is connected, by way of a crank arm and a coupling rod, to a float which is disposed in an essentially vertical guide tube. The coupling rod extends through the float and has spaced top and bottom stops providing for lost motion coupling between the float and the coupling rod whose weight is sufficient to keep the valve flap in an open position. When the fuel in the tank lifts the float and, after the float engages the top stop lifts the coupling rod, closing movement of the valve flap is initiated which is then fully closed by the inflowing fuel utilizing the lost motion distance between the float and the bottom stop of the coupling rod.

With this crank mechanism, the float is supported on the coupling rod by a joint with two degrees of freedom. On one hand, the coupling rod is supported between the two stop discs so as to be slightly pivotable in the drive plane, and on the other hand, the float can freely move between the two stop discs in an essentially linear way, that is, for the so-called rest stroke, when the coupling rod is in an upright position. In this range, the movement transmission is not constrained. Any float position within the range between the two stop discs corresponds to a particular valve flap position. As a result, during filling of the tank, the float can cause the valve flap to be closed shortly before the tank is full and, after completion of the filling procedure, it can again essentially open the valve flap without the need to empty the fuel tank first at least partially. The liquid level in the tank is not in a proportional relationship with the valve flap position.

This has the advantage that during filling with a normal fuel nozzle, the valve flap switches to a closed position only shortly before the desired full level of the liquid in the tank is reached, that is, when there is space left for example for two more liters of liquid. This generates a backup in the filler pipe which causes the fuel filler nozzle to shut off. The content of the filler pipe then flows into the tank by leakage through the valve. After adaptation of the liquid level in the tank and in the filler pipe, the valve flap opens again. The opening movement corresponds to the stroke length remaining between on the coupling rod the two stop discs.

With the arrangement according to the invention it is consequently possible to refill even flat tanks after partial draining that is after consumption of several liters. The fact that the valve flap re-opens relatively soon has the additional advantage that the tank can be emptied by a probe if this should be necessary for service.

Also, the valve flap will not generate annoying noises during normal vehicle operation. When the fuel tank is full, the fuel subject to swishing movement can pass below the open valve flap which therefore, is not pushed back and forth between its opening and closing stops.

Between the closed valve flap and the fill end of the filler nozzle, there is a leakage gap provided at least over some area. The predetermined leakage gap provides on one hand for a well defined drainage of the fuel from the filler pipe into the tank and, on the other hand, provides for some play between the valve flap and the surrounding filler pipe wall which permits an essentially friction free opening and closing of the valve flap.

The pivot axis of the valve flap and the center line of the float guide structure do not intersect. Furthermore, with such an eccentric linear crank breech mechanism, the end area of the filler pipe and the guide structure of the float are displaced with respect to each other, such that also their center lines do not intersect. With these design features, all the components of the arrangement are simple and can be realized at low costs as no alignments are required. In addition, the main fuel flow into the tank by-passes the linkage and lever structure which facilitates operation thereof.

The invention will be described in greater detail on the basis of the accompanying drawing.

BRIEF DESCRIPTION OF THE DRAWING

The sole FIGURE is a cross-sectional view of a portion of a fuel tank with an arrangement of a float-controlled tank fill limiting structure.

DESCRIPTION OF A PREFERRED EMBODIMENT

The FIGURE shows a part of a fuel tank 1 to which a filler neck 2 is connected. In this part of the fuel tank 1, there is provided an arrangement for limiting the fill level of the tank.

This arrangement comprises a float-operated valve flap 31, which forms, together with a float 21 and a lever linkage 25, 32, an eccentric crank of breech motion transmission mechanism. The drive member is the float 21. It acts, by way of a coupling rod 25, on the driven member which, in this case, is the valve flap 31 controlled by the crank arm 32.

The float 21 has a pot-like float body with a cylindrical outer shape. It is guided at its outer circumference by a guide tube 14 in which it is essentially vertically movably supported at its bottom end. It has an opening 22 through which the coupling rod 25 extends. In the float position as shown in FIG. 1, the coupling rod 25 is disposed with its upper stop disc 26 on the bottom wall of the float 21. The stop disc 26 is mounted controllably on the upper end of the coupling rod 25 for example by means of a screw 28. In the support area, the bottom wall of the float 21 may have formed therein several grooves 23 or other recesses which permit any fuel to flow into and out of the internal float space without restriction.

The coupling rod 25 is provided with a second lower stop disc 27 disposed below the first stop disc 26. The float 21 is supported on this second stop disc 26 whenever its buoyancy force is smaller than its weight-force.

The lower end of the coupling rod 25 is pivotally connected to the crank arm 32. At the pivot connection, the crank arm 32 is forked for better support of the coupling rod 25. At its opposite end, the crankarm is, in the embodiment shown, formed onto the side of the valve flap 31 so as to define an angle of 150° with the valve flap 31.

The valve flap 31 is for example a flat plane plate having the outer shape of a U. In the area of its upper straight horizontal end, a pivot axis 33 is provided. The valve flap 31 is pivotally supported in an essentially horizontally extending tank inlet end 11 of the filler neck 2. The tank inlet end 11 has a cross-section in the shape of a U, like the valve flap 31, so as to tightly accommodate the valve flap 31 in its closed position. Outside the tank inlet end 11, the filler neck 2 is circular in cross-section. At the bottom end of the tank inlet end 11, there is provided a stop 12 for the valve flap 31.

The guide tube 14 and the tank inlet end 11 are arranged in such a way that their axes do not intersect, but are disposed in spaced vertical planes. In the arrangement as shown in FIG. 1, the tank inlet end 11 is disposed so far behind the guide tube 14 that the cut away front side wall of the inlet end 11 which is integral with an upwardly extending reinforcement rib 16 is disposed slightly behind the center axis of the guide tube 14. Then the crank arm 32 which is disposed outside the front side wall of the inlet end 11 and the coupling rod 25 are disposed in the same plane.

The reinforcement plate 16 forms a connecting element between the guide tube 14 and the tank inlet end 11. It may also serve as structure for mounting the full level limiting arrangement to the fuel tank 1.

The guide tube 14 extends upwardly toward the top wall of the fuel tank 1, but remains spaced therefrom. It is closed on top except for a vent bore 15. If the vent bore is sized so as to form a throttle structure, it will dampen the linear movement of the float 21 in the guide tube 14.

At the beginning of a normal refueling of a fuel tank, the valve flap 31 is fully open because of the weight of the float 21 and the coupling rod 25 is in its lower end position. The valve flap 31 supporting the coupling rod 25 by way of the crank arm 32 abuts the top wall of the tank inlet end 11. The float 21 is disposed on the lower stop disc 27 of the coupling rod 25. The fuel can flow into the fuel tank 1 without restrictions.

During refueling, the fuel level reaches the float 21, the float rises with the fuel upwardly until it engages the upper stop disc 26. Until then, no forces act on the float 21 except for its own weight. Friction forces are neglected in this consideration.

As the float engages the upper stop disc 26, the weight of the coupling rod 25 with the stop discs 26 and 27 is added to the weight force on the float 21 that is these forces which act on the valve flap to keep it open when the tank is empty are taken up by the float that is they no longer act on the valve flap 31.

As soon as, with further increasing fuel level, the buoyancy force exceeds the additional weight force, the float rises further and lifts the coupling rod 25 and the crank arm 32. This movement initiates the closing movement of the valve flap 31 which is pivoted thereby into the flow of incoming fuel. After a pivot movement of the valve flap of about 20°, wherein the float rises by a "flap operating distance", the valve flap 31 is caught by the inflowing fuel and moved to its closed position into engagement with the stop 12. The float 21 is then relieved of the weight of the coupling rod 25 and rises until it engages the top wall of the guide tube 14 after a final travel distance.

The sum of the flap operating distance and the final travel distance of the float is the total travel of the float. The length ratio of the two travel lengths depends, among others, on the fuel volume flow, the wear state of the joints and the temperature-dependent play between the movable parts of the arrangement.

Upon closing of the valve flap 31, the fuel discharged from the refueling nozzle is backed up in the filler neck 2. As soon as the fuel backup reaches the refueling nozzle, the refueling nozzle is shut off. Then the fuel backed up in the filler neck flows through the leakage gap between the valve flap 31 and the tank inlet end 11 into the tank 1 until the liquid level in the filler neck 2 is the same as it is in the fuel tank 1. Then the fuel pressure at opposite sides of the valve flap is the same and the valve flap is opened partially by the weight force of the coupling rod 25 and the crank arm 32. The valve flap opening movement encompasses at least $\frac{2}{3}$ of its pivot movement range. The valve flap opening movement is stopped when the upper stop disc 26 is seated on the bottom wall of the float 21 and the weight and buoyancy forces on the float 21 and the linkage 25, 32 are in equilibrium.

With the incomplete opening of the valve flap 31, the valve flap 31 remains in the tank inlet end in the way of any fuel flow into the fuel tank 1, so that it immediately closes when additional fuel is added into the filler neck. This immediately causes a fuel backup in the filler neck and shutting off of the refueling nozzle. Overfilling is therefore prevented.

Already after a relatively small amount of fuel is consumed and the float drops slightly, the coupling rod 25, which is seated with its upper stop disc 26 on the float 21 drops with the float 21 whereby the valve flap 31 is fully opened. The weight of the coupling rod 25—without the buoyancy force of the float—keeps the valve flap 31 in its open end position.

When the fuel level has dropped from this point by about the remaining travel length, the float 21 is again disposed on the lower stop disc 27 providing in this way for additional force insuring that the valve flap is maintained in its open position.

What is claimed is:

1. Arrangement for limiting the fill level in a fuel tank having a filler neck with a tank inlet end, said arrangement comprising: a valve flap having an off-center axis by which it is pivotably supported in said tank inlet end so as to be movable between a closing position in which the valve flap blocks fuel flow into said tank and an open position in which said valve flap is pivoted against the direction of fuel flow into said tank, a crank arm projecting from said valve flap into said tank, a coupling rod connected to said crank arm and including top and bottom stop members arranged on said coupling rod in spaced relationship, a hollow cylindrical float linearly movably disposed in a float guide tube and receiving said coupling rod so as to be movable relative thereto between said spaced stop members, said coupling rod with said stop members and said crank arm having together a weight, which is sufficient to hold said valve flap in an open position and said stop members being sufficiently spaced to permit movement of the valve flap into a closed position by inflowing fuel once such movement is initiated by an initial movement of the valve flap when said float is raised by a rising fuel level and lifts with it said top stop member and the associated coupling rod.

2. An arrangement according to claim 1, wherein a leakage flow gap is provided between said tank inlet end of said filler neck and the valve flap when said valve flap is in a closed position.

3. An arrangement according to claim 1, wherein said valve flap has a horizontally extending pivot shaft and said guide tube has a center line which is spaced from said pivot shaft.

4. An arrangement according to claim 1, wherein said guide tube has a center line and is displaced sidewardly with respect to said tank inlet which also has a centerline end such that the center lines are spaced from one another.

5. An arrangement according to claim 1, wherein said tank inlet end has a cross-section in the circumferential shape of a U with a flat level top wall and said valve flap which has a corresponding shape has a pivot axis extending adjacent said flat top wall.

6. An arrangement according to claim 1, wherein said guide tube is open at its bottom but closed by an end wall at its top end with the exception of a nozzle bore extending through said end wall.

* * * * *